C. N. BARTON.
SECTIONAL MACHINERY REPAIR WASHER.
APPLICATION FILED MAR. 10, 1920.
1,418,052.
Patented May 30, 1922.
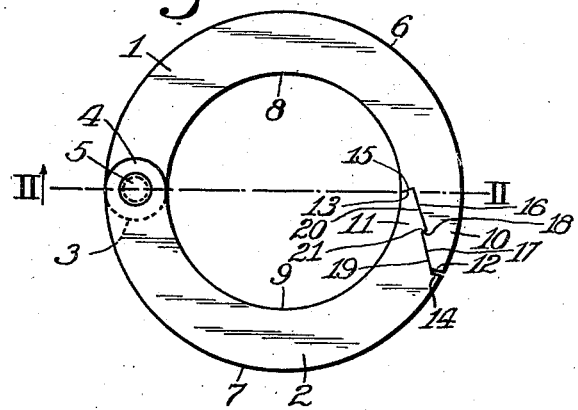
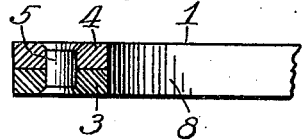
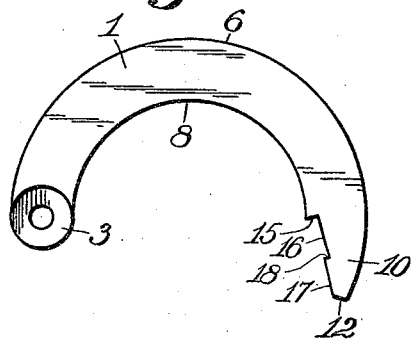
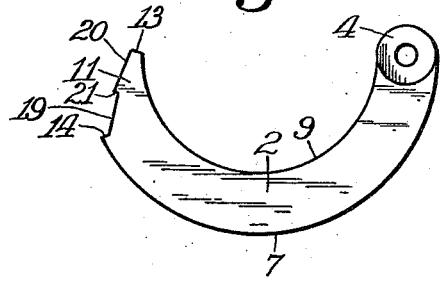
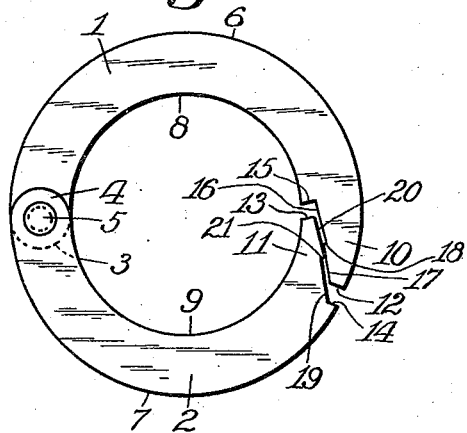
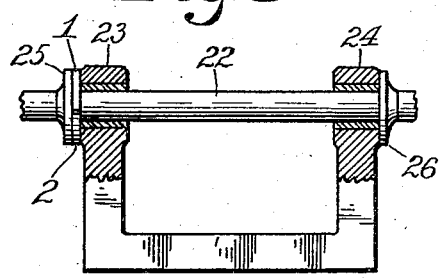
WITNESS:
Ed J. Clark.
F. M. Roeder.
INVENTOR:
Charles N. Barton,
BY
E. T. Silvius,
ATTORNEY.

UNITED STATES PATENT OFFICE.

CHARLES N. BARTON, OF INDIANAPOLIS, INDIANA, ASSIGNOR OF ONE-THIRD TO WILL PEEK AND ONE-THIRD TO JOHN W. LANGLEY, BOTH OF INDIANAPOLIS, INDIANA.

SECTIONAL MACHINERY REPAIR WASHER.

1,418,052.      Specification of Letters Patent.     Patented May 30, 1922.

Application filed March 10, 1920. Serial No. 364,671.

*To all whom it may concern:*

Be it known that I, CHARLES N. BARTON, a citizen of the United States, residing at Indianapolis, in the county of Marion and State of Indiana, have invented a new and useful Sectional Machinery Repair Washer, of which the following is a specification, reference being had to the accompanying drawings, and to the letters and figures of reference marked thereon.

This invention relates to an improved sectional repair washer or shaft-bearing extension that is designed to be used for eliminating lost motion due to wearing of parts in use and resulting in longitudinal play of machinery shafts or axles, the invention having reference more particularly to a washer that may be readily applied to a machinery shaft or axle between its bearing box and a collar or wheel on the shaft or axle, and at the place where the machinery is located so as to obviate the necessity of transporting the machinery to a workshop or removing the shaft or axle from its place in the machinery.

An object of the invention is to provide an improved machinery repair washer that shall be so constructed as to be adapted to be readily placed on a rotary shaft or axle to eliminate or reduce longitudinal motion of the shaft in its bearings, as an extension of a worn bearing, more especially in case where a solid washer can not be slipped over an end of the shaft to the shaft bearing.

Another object is to provide a sectional machinery repair washer of such construction as to be adapted to closely embrace the shaft or axle on which it may be needed, and adapted also to permit the washer to be inserted and locked in place between end or thrust bearings, and so as to fully fill the space betweein a journal bearing and a collar or wheel on a shaft or axle mounted in the bearing, particularly when a stop collar may be found to be an integral part of a shaft or axle or otherwise fixed thereto so as to be non-adjustable as may occur in small railway cars or in various agricultural machinery.

A further object is to provide an improved machinery repair washer of such construction as to be adapted to not only be readily applied, but which also shall be adapted to be readily removed to be replaced by a relatively thicker washer, and which shall be cheaply produced and be durable and economical in use with resultant saving in repair expenses.

With the above-mentioned and other objects in view, the invention consists in an improved sectional machinery repair washer having novel features of construction with respect to the locking features thereof and mode of application; further consisting also in the parts and combinations and arrangements of parts as hereinafter particularly described and further defined in the claims appended hereto.

Referring to the drawings,—Figure 1 is a plan view of the improved washer as preferably constructed; Fig. 2 is a fragmentary section on an enlarged scale on the line II—II in Fig. 1; Fig. 3 is a plan of one of the two parts of the sectional washer; Fig. 4 is a plan of the remaining one of the two parts reversed in arrangement relatively to that in Fig. 1; Fig. 5 is a plan of the improved washer in which the two parts are shown as in position ready to be locked together; and, Fig. 6 is a side view of a journaled shaft to which the improved washer is applied as illustrating one of the purposes and application of the invention.

Similar reference characters indicate like elements or features of construction throughout the various figures of the drawings and herein referred to in detail.

As preferably constructed the improved repair washer comprises two sections of semi-circular contour and hinged together at one end, the sections being of uniform thickness throughout excepting at their hinge portions, the opposite ends of the sections being adapted to be locked together without requiring relatively lateral movement of the sections; more specifically there being two curved sections 1 and 2 having relatively thin hinge portions 3 and 4 respectively at one end thereof, the portions being arranged in over-lapping position and connected together by a suitable pivot 5. The sections or parts of the washer have convexly curved peripheral portions 6 and 7 respectively, so that the peripheral edge of the complete washer is cylindrical, the peripheral portion 6 of one section preferably being longer circumferentially than the peripheral portion 7 of the remaining section. The section 1 has a concave inner edge 8 and the section 2 has also a concave inner edge 9, the inner edges being semi-circular so as to closely embrace a cylindrical shaft, the two inner edges preferably being circumferentially of equal length, so that each section shall embrace exactly one-half of the shaft or axle. The section 1 has a tongue 10 which is narrower at its base than the body and projects from the body of the section onto a tongue 11 formed on the companion section 2, the tongues being generally tapering so as to have relatively narrow blunt ends 12 and 13 respectively. The section 2 has a shoulder 14 extending from its peripheral portion and the end 12 of the tongue 10 extends nearly to the shoulder, but preferably not close to the shoulder, leaving a space between them to receive a tool. The section 1 has a shoulder 15 that extends from the concave edge 8 and is engaged by the end 13 of the tongue 11, for maintaining the space between the end 12 and the shoulder 14, the shoulder 15 being approximately on the chord or median line II—II. The inner side of the tongue 10 that is presented towards the outer side of the tongue 11 has a joint face 16 extending from the shoulder 15 and another joint face 17 on another plane so that a locking shoulder 18 is formed that faces the shoulder 15, the face 16 being in a recess in the tongue, and the outer side of the tongue 11 has a joint face 19 that extends from the shoulder 14 towards the end 13 and another joint face 20 on a different plane so that a locking shoulder 21 is formed that faces the shoulder 14 and is adapted to be engaged by the shoulder 18.

The sections of the washer are composed of suitable material so as to be slightly elastic under pressure, the narrow tongues being adapted to be more yielding than the bodies, to permit the sections to be clasped and securely locked together and also permit them to be forcibly sprung apart.

As will be seen by reference to Fig. 6 a shaft 22 is journaled in bearings 23 and 24 and provided with stop collars 25 and 26 to co-operate with the bearings respectively and prevent longitudinal movement of the shaft. The improved washer is represented as applied to the shaft between one of the collars and one of the bearings to take up lost motion which may have developed in the operation of the shaft or occurred as a result of inaccurate workmanship.

In practical use, when one of the repair washers is needed a washer of the required thickness is selected, washers of different thicknesses being kept in stock; and after swinging the sections apart sufficiently to permit the ends of the locking tongues to pass over the shaft or axle transversely thereof until the hinged ends are brought into contact with the shaft, the sections are brought together on the shaft and the tongues forced together, the face 17 sliding against the face 20 until the locking shoulders are brought into engagement following the movement of the face 17 to the face 19 and the face 16 to the face 20, so that when the sections are locked together the end 13 is stopped against the shoulder 15 and the end 12 is near to the shoulder 14. In case it is subsequently desired to remove the washer to permit a relatively thicker washer to be applied a suitable tool can be inserted between the tongue end 12 and the shoulder 14 and, using the shoulder 14 as a fulcrum the end 12 can be forced outwardly so as to cause the shoulder 18 to be disengaged from the shoulder 21, after which the sections may be swung apart and removed from place, permitting the application of the thicker washer which may be of such size as to completely fill the space between the bearing and the collar or wheel on the shaft or axle.

Having thus described the invention, what is claimed as new is—

1. A machinery repair washer comprising a circular plate composed of two curved sections hinged together at one end, each section having a tapered tongue at its opposite end, each tongue having a base portion that is relatively narrower than the diametrical width of the section and having also a relatively narrower blunt end, the outer portion of one of the sections having a stop shoulder at the base of the tongue and the outer side of the tongue having a locking shoulder facing the stop shoulder, the inner portion of the other one of the two sections having a stop shoulder at the base of the tongue and the inner side of the tongue having a locking shoulder facing the stop shoulder to co-operate with the first-described locking shoulder.

2. A machinery repair washer comprising a circular plate composed of two curved sections hinged together at one end, the sections being uniform in thickness throughout excepting at their hinged ends, each section having a tapered tongue at its opposite end, one of the sections having a stop shoulder extending from its concave edge and the tongue thereon having a joint face on its inner edge extending from the shoulder and provided with a locking shoulder facing towards the stop shoulder, and the remaining section having a stop shoulder extending from its convex edge and the tongue thereon having a joint face on its outer edge extending from the stop shoulder and provided with a locking shoulder facing towards the stop shoulder to co-operate with the first-described locking shoulder.

3. A machinery repair washer comprising a circular plate composed of two curved sections hinged together at one end, the sections being uniform in thickness throughout excepting at their hinged ends, each section having a tapered tongue at its opposite end, one of the sections having a stop shoulder extending from its concave edge and the tongue having a joint face on its inner edge extending from the shoulder and provided with a locking shoulder facing towards the stop shoulder, the remaining section having a stop shoulder extending from its convex edge and the tongue thereon having a joint face on its outer edge extending from the stop shoulder and provided with a locking shoulder facing towards the stop shoulder to co-operate with the first-described locking shoulder, said stop shoulder last-described being positioned to clear the end of the first-described tongue for receiving an unlocking tool between the shoulder and the tongue.

4. A shim or washer, adapted to be applied radially to a shaft, without displacement of parts, within a space approximately equal to its own thickness, for compensating for wear on the sides of pivotal or rotary parts, said shim or washer comprising a plurality of segments having interlocking parts, said segments having a thickness substantially equal to the width of the space in which they are to fit, and being adapted to move together to bring the interlocking parts to interlocking position within a space substantially equal to the thickness thereof, said interlocking parts comprising tongues on the segments respectively and of a thickness corresponding to that of the segment, the outer portion of one of the segments having a stop shoulder at the base of the tongue and the outer side of the tongue having a locking shoulder facing the stop shoulder, the inner portion of the remaining one of the segments having a stop shoulder at the base of the tongue and the inner side of the tongue having a locking shoulder facing the stop shoulder to be moved into locking position with the first-described locking shoulder, the last-mentioned tongue being adapted to be moved to bring the locking shoulder thereon from said locking position by a tool or manipulation applied to the tongue and an externally accessible portion of said washer.

In testimony whereof, I affix my signature in presence of two witnesses.

CHARLES N. BARTON.

Witnesses:
E. T. SILVIUS,
F. M. ROEDER.